J. A. CAMERON.
ANIMAL TRAP.
APPLICATION FILED AUG. 22, 1912.
1,142,781.
Patented June 8, 1915.
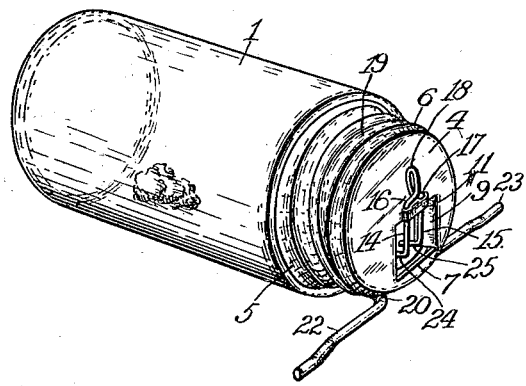
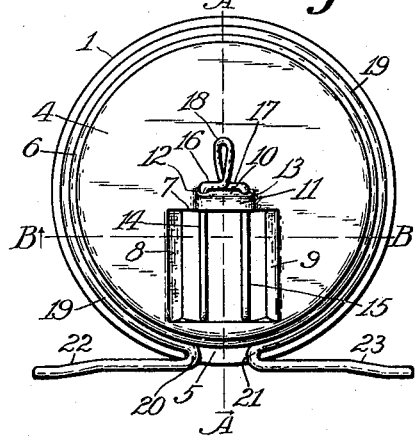
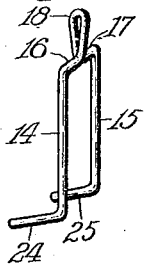
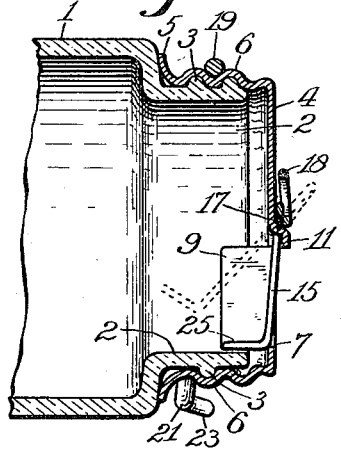
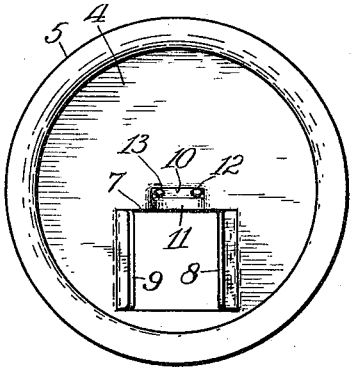
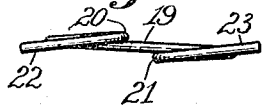
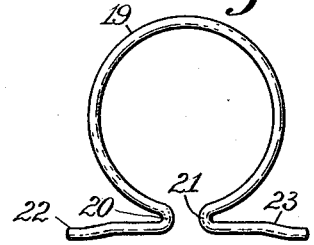
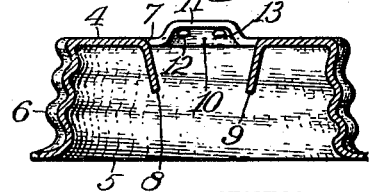
WITNESSES:
J. H. Gardner
M. J. Messenheimer
INVENTOR:
Joseph A. Cameron,
BY
E. T. Silvius,
ATTORNEY.

UNITED STATES PATENT OFFICE.

JOSEPH A. CAMERON, OF INDIANAPOLIS, INDIANA, ASSIGNOR TO GEORGE W. INFIELD, OF MARION COUNTY, INDIANA.

ANIMAL-TRAP.

1,142,781.  Specification of Letters Patent.  Patented June 8, 1915.

Application filed August 22, 1912. Serial No. 716,378.

*To all whom it may concern:*

Be it known that I, JOSEPH A. CAMERON, a citizen of the United States, residing at Indianapolis, in the county of Marion and State of Indiana, have invented a new and useful Animal-Trap, of which the following is a specification, reference being had to the accompanying drawings and to the letters and figures of reference marked thereon.
This invention relates to apparatus for trapping animals alive, especially for trapping mice, and which is adapted to be constructed of suitable dimensions for trapping rats or in other dimensions for trapping other animals, the invention having reference more particularly to a transparent animal trap in which bait may be seen by the animals.

The invention has for its object to provide a relatively cheap and reliable animal trap for use in dwellings or other buildings, or wherever desired, a further object being to provide an appliance that shall be so constructed as to be adapted to be connected to a fruit jar, so as to convert the jar into a receptacle for confining the animals in order that the animal traps may be obtained at trifling expense.

A still further object is to provide an animal trap appliance that shall be so constructed as to be adapted to be manufactured cheaply in large quantities, and be relatively small so that the appliance may be shipped in small space and at small cost and be adapted to be conveniently retailed for use.

With the above mentioned and other objects in view, the invention consists in an appliance adapted to be detachably connected to the neck of a glass jar and capable of entrapping animals entering the jar or receptacle.

The invention consists also in certain novel parts and in the combinations and arrangements of parts as hereinafter particularly described and claimed.

Referring to the drawings, Figure 1 is a perspective view of the complete animal trap as preferably constructed; Fig. 2, a front elevation thereof; Fig. 3, a perspective view of the door of the trap; Fig. 4, a fragmentary vertical section on the line A A in Fig. 2; Fig. 5, an elevation of the inner side of the front of the animal trap; Fig. 6, an inverted view of a clasp provided with arms for maintaining the trap in normal operative position; Fig. 7, a front elevation of the clasp and its arms, and Fig. 8, a section of the front on the line B B in Fig. 2, omitting the door.

As preferably constructed the animal trap comprises a suitable receptacle or box 1 which may suitably consist of a glass fruit jar, being readily obtainable at small cost and as will be understood is cylindrical, and it has a cylindrical neck 2 provided with external screw threads 3. The vessel or box, however, may be of any suitable contour and dimension, not cylindrical of necessity.
The improvement comprises more particularly a front plate 4 having a flange 5 provided with screw threads 6, the flange being adapted to be placed on the neck 2 and secured by means of the screw threads 6 engaging the screw threads 3, or the flange may be otherwise secured to the neck, it being understood that the front may be turned more or less relative to the neck when being tightened thereon. The normally lower portion of the front 4 has a doorway 7 therein on opposite sides of which are inwardly extending wings or guards 8 and 9 respectively. The metal of the front above the doorway is pressed outward to form a relatively small ledge 10 from which extends an offset portion 11, the ledge having two perforations 12 and 13 therein. A suitable trap door or grating is provided for closing the doorway and preferably comprises two bars 14 and 15 suitably connected together by means of heads 16 and 17 integrally connected with a loop shaped handle 18, the bars extending through the perforations, the heads being supported upon the ledge 10, and the handle may be used for opening the door. The bars are of suitable length to be stopped against the front 4 at the bottom of the doorway so as to prevent the door from swinging outward, and the door is prevented from swinging outward by the handle 18 coming in contact with the front 4 above the doorway.

When the animal trap is cylindrical as illustrated it is suitably provided with means for maintaining it in normal position so that the door shall be suspended at the top of the doorway, it being necessary to prevent rolling of the vessel or box, and in such case the front is provided with laterally extending arms adapted to rest on the surface on which the vessel or box may be placed.

Preferably an annular spring clasp 19 is provided which is adapted to engage the screw threads 6 while embracing the flange of the front 4, the clasp having two crooks 20 and 21 from which extend two arms 22 and 23 respectively, so as to form a substantial base, and as will be understood the clasp may be turned more or less for adjustment on the flange so that the crooks shall be below the doorway. In some cases the lower ends of the bars 14 and 15 of the door have lateral extensions 24 and 25 respectively that are adapted to be stopped on the inner side of the neck 2 to prevent the animal from forcibly bending the bars out in case the bars are not properly stopped by the front. It should be understood that the front and the devices thereon may be manufactured and sold to users who may readily connect the front to the neck of a glass jar.

In practical use it is customary to place suitable bait in the receptacle to induce the animal to enter by pushing the door inward as shown in dotted lines in Fig. 4, the door falling by gravity to closed position between the guards after the animal passes so as to entrap the animal and prevent its return. The animals may be humanely killed in the receptacle if desired, or the front may be removed so that the animal or animals may be easily dropped out of the receptacle into water and drowned.

Having thus described the invention, what is claimed as new is:—

1. An animal trap appliance including a front plate having a doorway therein and also a ledge adjacent to the doorway having two perforations, the plate having also an offset portion extending from the ledge, and two bars extending through the perforations respectively and at one side of the offset portion and also across the doorway, the two bars having two head portions respectively that are rotatably supported upon the ledge, the head portions being connected together.

2. An animal trap appliance including a front plate having a doorway in its normal lower portion and also two perforations above the doorway, and a trap-door comprising two bars extending through the two perforations respectively and having two head portions respectively that extend horizontally each toward the other and in contact with the front plate, the two bars normally extending across the doorway and opposite one side of the plate, and a handle connected to the head portions and extending adjacent to the opposite sides of the plate.

3. An animal trap comprising a cylindrical receptacle having a neck, a front plate connected to the neck and having a doorway therein and also two perforations above the doorway, and a trap-door comprising two bars extending through the two perforations respectively and having two head portions respectively that are supported by the front plate and normally extend downward on the inner side of the plate across the doorway, the bars having two extensions respectively that extend from their lower ends and downwardly at an inclination to the inner side of the neck, and a handle connected to the head portions and extending beyond the outer side of the front plate.

4. An animal trap appliance including a front plate having a doorway therein, the plate having a ledge adjacent to the doorway provided with two perforations, the plate having also an offset portion extending from the ledge, and two bars extending through the two perforations respectively and at one side of the offset portion and across the doorway, the two bars having respectively two head portions that are supported upon the ledge, and a handle connected to the head portions.

5. An animal trap appliance including a circular front plate having a cylindrical flange and having also a doorway and lateral guards at opposite sides of the doorway, the flange having screw-threads adapted for engagement with a threaded receptacle, a door swingingly supported on the plate above the doorway, and an annular spring-clasp embracing the flange between the screw-threads and having two crooks normally positioned below the plane of the bottom of the doorway, the crooks having each an arm thereon, the arms respectively extending back and outwardly in opposite directions.

In testimony whereof, I affix my signature in presence of two witnesses.

JOSEPH A. CAMERON.

Witnesses:
E. T. SILVIUS,
E. WHITSETT.

Copies of this patent may be obtained for five cents each, by addressing the "Commissioner of Patents Washington, D. C."